United States Patent

[11] 3,630,448

| [72] | Inventor | Richard D. Chapin<br>368 North Colorado Avenue, Watertown,<br>N.Y. 13601 |
|---|---|---|
| [21] | Appl. No. | 1,158 |
| [22] | Filed | Jan. 7, 1970 |
| [45] | Patented | Dec. 28, 1971<br>Continuation-in-part of application Ser. No.<br>847,210, Aug. 4, 1969. This application<br>Jan. 7, 1970, Ser. No. 1,158 |

[54] OVERHEAD SPRAY SYSTEM
8 Claims, 10 Drawing Figs.

[52] U.S. Cl. .................................................. 239/111,
239/272, 239/547, 239/551, 239/570, 248/62
[51] Int. Cl. ........................................................ B05b 1/14
[50] Field of Search............................................ 239/106,
110, 111, 271, 272, 542, 536, 547, 548, 550, 551,
566, 570; 40/17; 248/58, 61, 62, 71

[56] References Cited
UNITED STATES PATENTS

| 1,659,470 | 2/1928 | Owen et al. ................. | 239/547 |
|---|---|---|---|
| 2,806,740 | 9/1957 | Fredrickson et al. ........ | 239/571 X |
| 2,834,634 | 5/1958 | Johnson ...................... | 239/111 |
| 2,879,945 | 3/1959 | Johnson ...................... | 239/547 X |
| 3,199,784 | 8/1965 | Chapin ........................ | 239/547 X |
| 3,199,791 | 8/1965 | Chapin ........................ | 239/547 X |
| 3,478,967 | 11/1969 | Horton et al. ................ | 239/588 |

FOREIGN PATENTS

| 1,170,162 | 11/1969 | Great Britain ............... | 239/571 |
|---|---|---|---|
| 6,408,723 | 9/1965 | Netherlands ................ | 239/571 |

*Primary Examiner*—M. Henson Wood, Jr.
*Assistant Examiner*—Michael Y. Mar
*Attorneys*—Clarence A. O'Brien and Harvey B. Jacobson ABSTRACT: A watering system for long runs, normally greenhouse benches or the like, comprising an overhead installation including a tensioned suspension cable from which a series of support cradles are suspended by hangers. The support cradles seat an elongated water main across the aligned upper portions thereof in a self-leveling manner, and at the same time support a series of downwardly directed nozzles which in turn incorporate independent shutoff means. Each nozzle is communicated with the main through a valve which automatically terminates flow of water to the valve upon a drop in pressure below a predetermined point. A pressure-release valve is communicated with the main itself for effecting a fluid discharge therefrom and a pressure release upon a dropping of the pressure to a predetermined point.

Patented Dec. 28, 1971
3,630,448
3 Sheets-Sheet 1
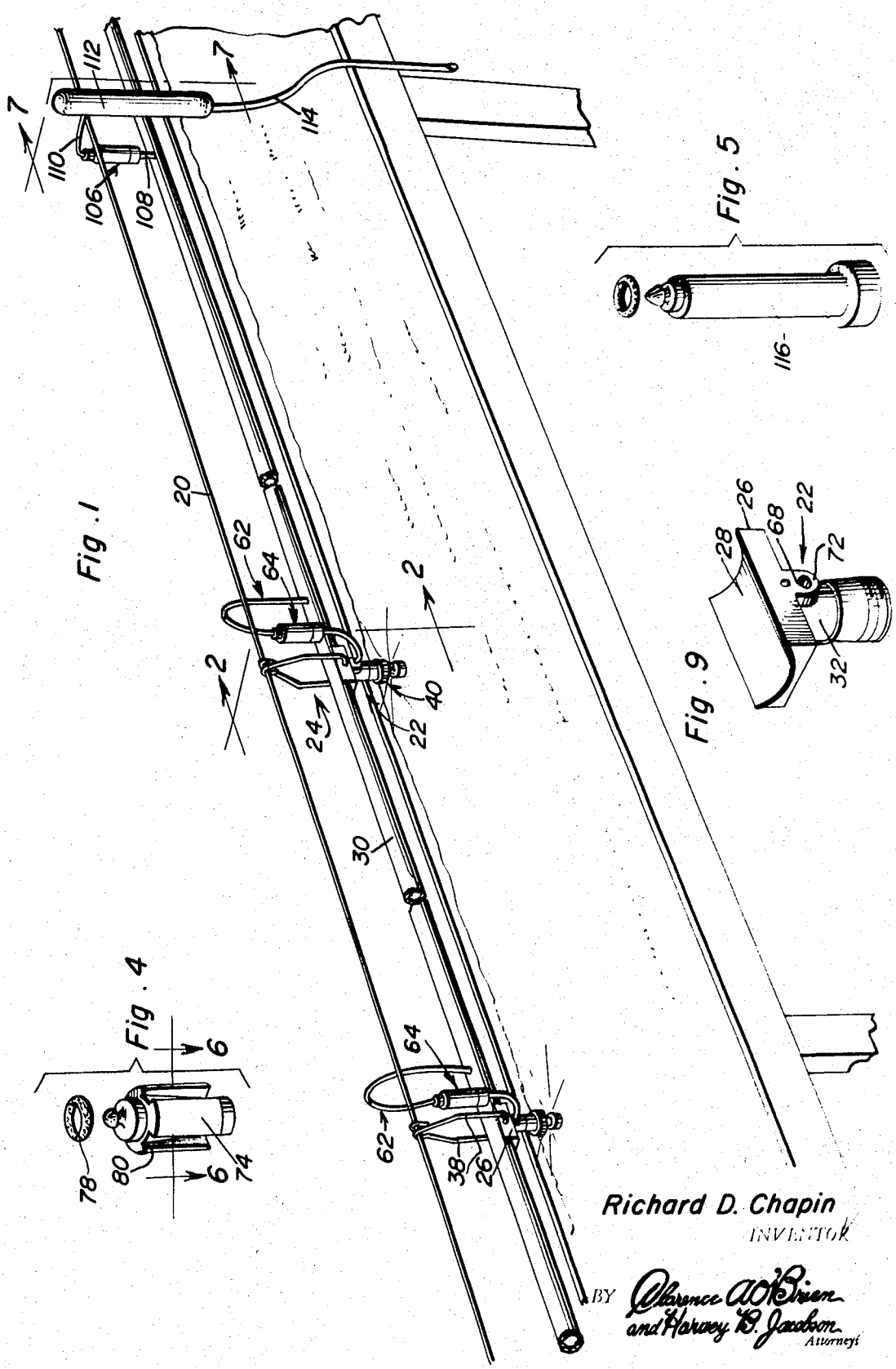
Richard D. Chapin
INVENTOR
BY Clarence A. O'Brien
and Harvey B. Jacobson
Attorneys

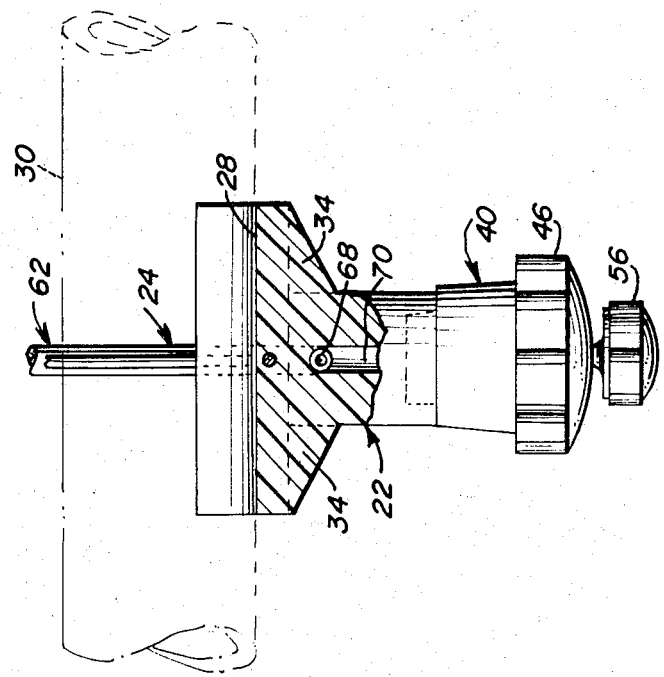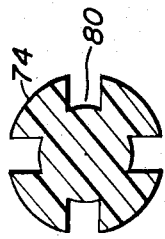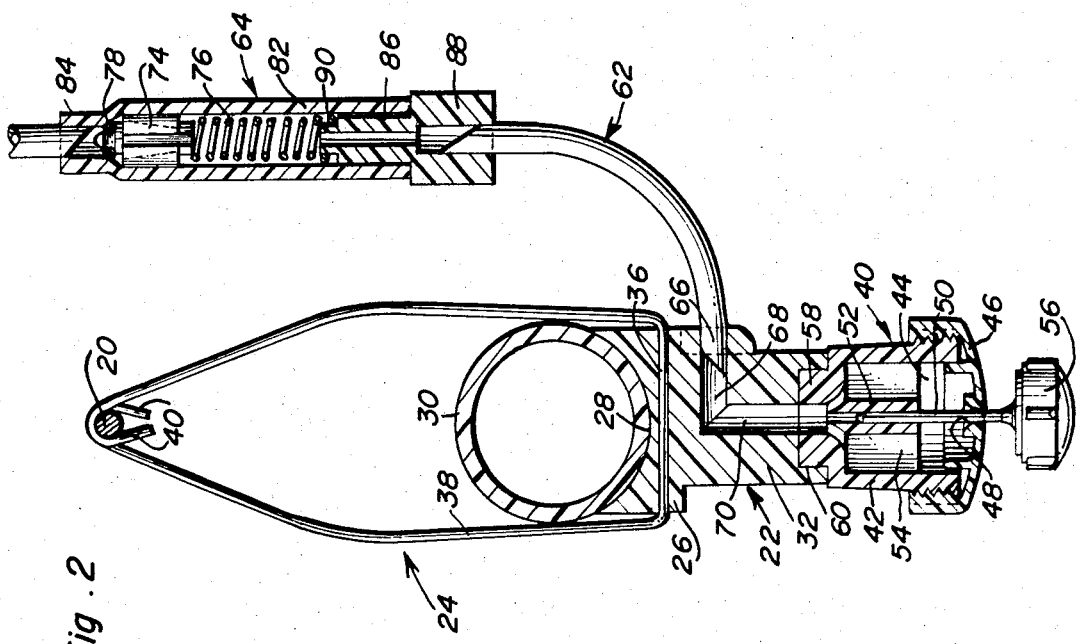

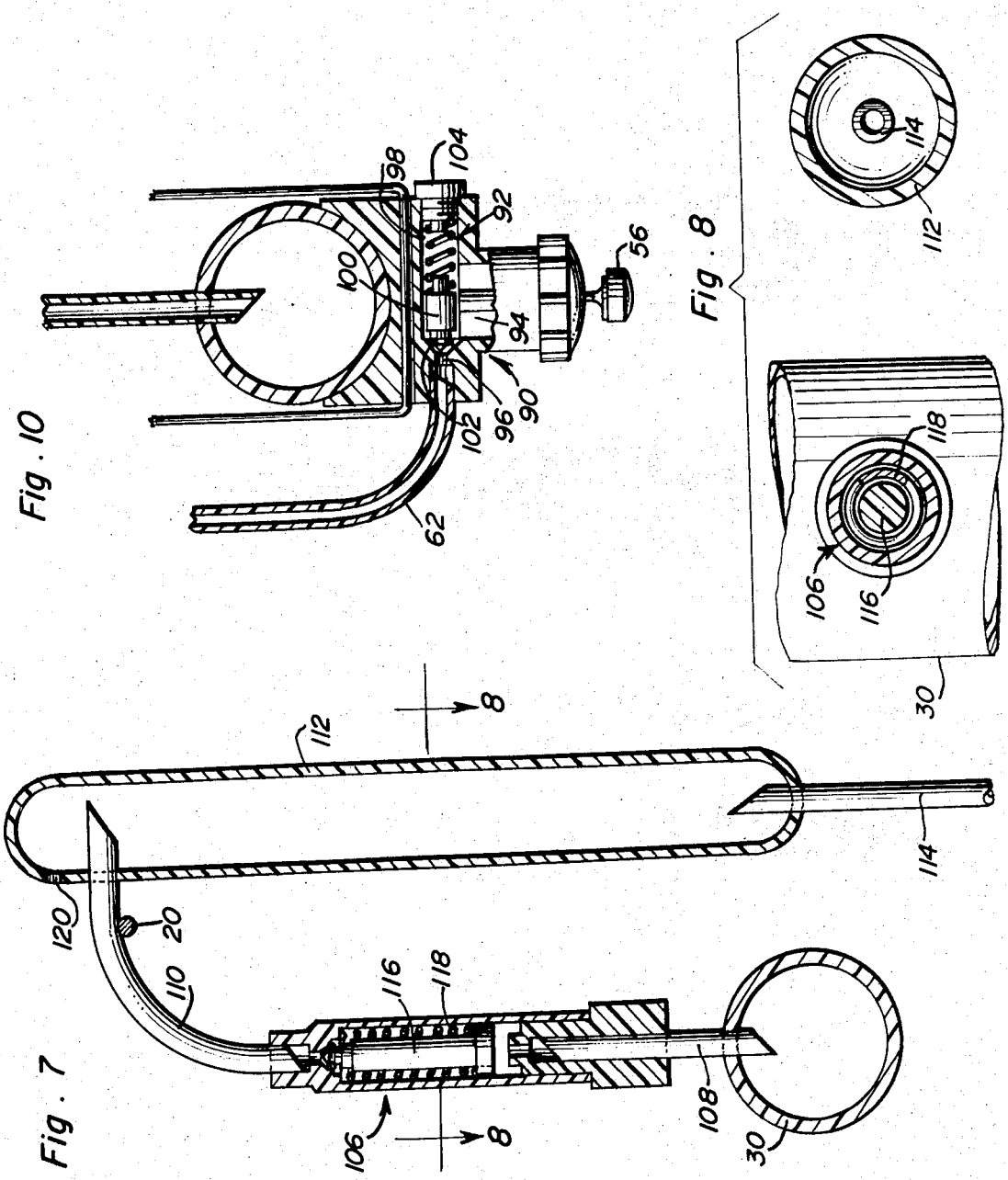

3,630,448

OVERHEAD SPRAY SYSTEM

This is a continuation-in-part of application Ser. No. 847,210, for Suspension Spray System, filed Aug. 4, 1969.

The instant invention is generally concerned with the distribution of water over long runs in an even, thorough and economical manner. More specifically, the invention herein is concerned with an overhead spray system wherein an elongated main is suspended directly over the area to be watered, the main being supported on a series of support cradles which in turn mount a series of downwardly directed spray nozzles to which the flow of water is valve-controlled.

It is a primary object of the instant invention to provide an overhead spray system which, as opposed to the more conventional rigid systems, provides for a flexible system wherein the nozzles are self-aligning so as to insure a proper and uniform spraying of the involved area.

In conjunction with the above object, it is a significant intention of the instant invention to provide a valve control system wherein a simultaneous operation of all of the nozzles along the main is effected, each nozzle having an associated valve which, in conjunction with a pressure release valve associated with the main itself, provides for an instant and complete on-off control of the system.

Likewise, it is considered particularly significant that the nozzles are orientated below the main whereby the main is maintained dry so as to eliminate any tendency for water to accumulate thereon and subsequently drip therefrom, such dripping having a detrimental effect on small seedlings or the like lying therebeneath. It will be recognized that the positive shutoff action of the nozzles, effected by the associated valves, also eliminates any undesirable and possibly highly detrimental drippage from the nozzles themselves.

Additionally, an important object of the instant invention is to provide means for rapidly releasing the pressure within the main so as to facilitate the rapid and complete nozzle cutoff, while at the same time maintaining the main full of water so as to insure, upon a reactivation of the system, an immediate and constant misting discharge through all of the nozzles simultaneously for a provision of the desired uniform coverage.

The objects of the instant invention are achieved basically through the provision of a system which utilizes a series of support cradles hung from an overhead-tensioned suspension wire and in turn both cradling an elongated water main and supporting a series of downwardly directed spray nozzles in spaced relation to the supported main. Each of the nozzles is communicated with the main through a valve-controlled supply tube, such valves operating so as to shut off the flow of water to the associated nozzles upon the dropping of the pressure within the main to a predetermined point. The main itself is also provided with a pressure release valve which communicates with a drainage line and an interposed enlarged chamber so as to prevent any possible siphoning action. The pressure release valve is so adjusted as to open, and hence allow a discharge from the main, upon the dropping of the pressure therein to a predetermined level above the level at which the nozzle valves close, the cooperating action of the valves maintaining the main full of water whereby an instant and equalized discharge through the nozzles will be effected upon a reactivation of the system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a greenhouse bench with the system of the instant invention mounted thereover;

FIG. 2 is an enlarged cross-sectional view taken substantially on a plane passing along line 2—2 in FIG. 1;

FIG. 3 is a side elevational view of a support cradle and mounted nozzle, with a portion thereof broken away for purposes of illustration;

FIG. 4 is a perspective detail of the sliding valve member utilized within each nozzle-associated valve;

FIG. 5 is a perspective detail of the sliding valve member associated with the pressure release valve;

FIG. 6 is a transverse cross-sectional view taken substantially on a plane passing along line 6—6 in FIG. 4;

FIG. 7 is an enlarged cross-sectional view taken substantially on a plane passing along line 7—7 in FIG. 1;

FIG. 8 is a cross-sectional detail taken substantially on a plane passing along line 8—8 in FIG. 7;

FIG. 9 is a perspective detail of the support cradle and a portion of the associated nozzle; and FIG. 10 is an enlarged cross-sectional view of a modified form of support cradle wherein the nozzle-and-flow control valve are integrally formed therewith and therein.

Referring now more specifically to the drawings, reference numeral 20 is used to designate the tensioned suspension cable by which the overhead spray system of the instant invention is mounted, this cable 20 extending in overlying relation to the particular run to be watered, for example a greenhouse bench as illustrated in FIG. 1.

A plurality of supports or support cradles 22 are individually suspended from and below the suspension cable 20 by wire hangers 24. Each of the supports 22 includes a rectangular head portion 26 defining an upwardly directed full length arcuate seat or cradle 28 for receiving and supporting the elongated water main 30. The support 22 also includes a depending cylindrical stem 32 integral with the head portion 26, the head 26 and stem 32 being further rigidified relative to each other by integrally formed diametrically opposed gussets 32, note particularly FIG. 3.

The hanger 24 associated with each support or support cradle 22 has the central or bight portion 36 thereof extending rotatably through the head portion 26 immediately below the arcuate seat 28 and in central alignment with the support 22 for a generally balanced suspension thereof. To the lateral sides of the head portion 26, the hanger 24 is provided with generally parallel upwardly extending legs 38 which, toward the upper ends thereof, converge toward each other and terminate in reversely bent hook portions 40 which are received over the suspension cable 20 in a manner so as to swing freely thereon. It will be appreciated that the hanger legs 38 are located sufficiently outward of the opposed sides of the support head portion 26 so as to freely receive the supported main 30 therethrough. As will be appreciated from FIG. 1, the supports 22 are aligned at spaced points along the suspension cable 20 and support the elongated main in an elevated position relative to the area to be sprayed, the weight of the main insuring a proper alignment of the supports 22 through the pivotal engagement of the hangers 24 with the suspension cable 20, while the pivotal engagement of each support 22 with the bight portion 36 of the associated hanger 24 enables an angular adjustment of the support 22 so as to effect a firm and complete seating of the main. The ability of the supports 22 to automatically adjust and align themselves is considered particularly significant in achieving a proper orientation of the nozzles 40 so as to insure a proper spray coverage, whether this be a gentle misting or a heavy watering.

The nozzle 40, noting FIG. 2 in particular, is secured to the stem portion 32 of the support 22 and forms a depending continuation thereof. Structurally, the nozzle 40 includes a generally cylindrical body 42 defining an enlarged internal downwardly opening chamber 44 which is selectively closed by a dome-shaped cap 46 threaded on the lower end of the body in surrounding relation thereto. The cap 46 is provided with a central water-discharging opening or port 48, the opening 48 loosely receiving an elongated rigid stem 50 slidably therethrough. The upper end of the stem 50 is frictionally received within a vertical sleeve 52 provided centrally within the chamber 44 and maintained by radial webs 54 extending between the central sleeve 52 and the surrounding chamber wall. Mounted on the lower end of the stem 50, below the cap 46, is an enlarged water-diffusing head 56 having an upwardly directed upper water-diffusing surface aligned so as to receive and outwardly deflect water-discharging through the cap opening 48. This diffusing upper surface of the head 56, where it adjoins the stem 50, assumes a slightly conical configuration whereby, upon an upward pushing of the head 56, a sealing of the water-discharging opening 48 will be effected. The frictional engagement of the stem 50 within the internal sleeve 52 is such so as to positively retain the stem and head in the position to which it is manually moved. Thus, not only does the diffusing head 56 act as a means for effecting an outward spraying of the water, but also as a means for sealing off the particular nozzle. If so desired a slight variation in the spray pattern can be effected through a vertical adjustment of the water diffusing head 56.

The actual mounting of each nozzle 40 on the associated support of support cradle 22 is effected through a reduced diameter upwardly extending integral projection 58 on the nozzle body 42 being telescopically received within a downwardly opening socket 60 provided centrally in the lower end of the stem 32. This interlocking can be solely frictional, or reliance can also be had on some appropriate binding means.

Water is introduced into each internal nozzle chamber 54 from the overlying main 30 through an elongated supply tube 62 which has a shutoff valve 64 interposed therein between a first end friction engaged through the wall of the main 30 into flow-receiving communication therewith, and the second end 66 frictionally engaged within the outer end of a transversely extending bore 68 in the support 22. The inner end of the bore 68 communicates directly with a downwardly extending vertical passage 70 which continues through the nozzle projection 58 and into the chamber 44 about the central sleeve 52. Noting FIG. 9 in conjunction with FIG. 2, it will be seen that an integral enlargement 72 is provided on the stem portion 32 about the outer end of the bore 68 so as to provide additional depth thereto for a more positive frictional gripping of the tube end 66.

The valve 64 interposed within each supply line 62 includes opposed ends which frictionally receive the adjoining ends of the two tube sections which combine, through the valve 64, to define the flow path from the main 30 to the associated support 22. The valve 64 includes a sliding valve member 74 spring-biased, by an expanded coiled compression spring 76, so as to seat a sealing O-ring 78 at that end of the valve 64 directed toward the main 30. In this manner, it will be appreciated that in the absence of a predetermined pressure in the main, the valve 64 will close, shutting off flow to the corresponding nozzle 40. It is contemplated that the necessary pressure for opening the valve 64 be approximately 2 pounds whereby upon a dropping of the pressure in the main below 2 pounds, the valve 64 will close. In this manner, there will be no partial or drip discharge from the nozzle when the system is shut down, such as could cause damage to seedlings or the like, notwithstanding the presence of water in the main 30 itself. The sliding valve member 74, noting FIGS. 4 and 6, is preferably provided with side grooves 80 below the O-ring 78 so as to allow for the free flow of water thereby upon an unseating of the valve member 74. In actual construction, the body of the valve 64 includes an elongated spring and valve member receiving hollow body 82 having a reduced diameter portion 84 at the end thereof directed toward the main 30. The second end of the valve body 82 receives the elongated integral stem 86 of a hollow plug which includes, in addition to the stem 86, an enlarged tube section receiving head 88 which butts against and generally closes the second end of the body 82. The inner body receiving end of the stem 86 is reduced, as at 90, so as to define a spring seat, the inner end of the sliding valve member 74 being similarly formed for the accommodation of the corresponding end of the spring 76. With reference to FIG. 1, it will be appreciated that the supply lines 62 are of a length so as to not interfere with the self-aligning nature of the cradle supports 22 and the associated nozzles 40.

Attention is now specifically directed to FIG. 10 wherein a modified form of cradle support 90 and valve unit 92 has been illustrated. In this form, the valve unit 92, rather than being positioned between the opposed ends of the supply line 62, is orientated within the support 90 just forward of the nozzle end of the associated supple tube 62, between the end of the supply tube 62 and the internal chamber 94 of the corresponding nozzle. More particularly, the lower end of the supply tube 62 of the form of FIG. 10 is frictionally received within the outer end of a transverse bore 96 in the support 90 which bore, inward of the supply line end, forms a valve chamber 98 for a reception of the spring-loaded valve member 100. The valve member 100 is biased toward a valve seat 102 formed within the bore 96 and, as was the case with the valve member 74, requires a pressure of approximately 2 pounds to unseat and allow a flow of water into the nozzle chamber 94. The second end of the valve chamber 98 is closed by an appropriate threaded plug 104 to allow for a removal, cleaning, and replacement of the valve structure. Thus, as is the case with the arrangement of FIG. 2, a valve has been associated with the nozzle in a manner so as to, upon a shutting off of the system, avoiding any tendency for the water to continue to drip or discharge from the nozzle. It will also be appreciated that this is completely separate from the complete nozzle cutoff provided by the adjustable diffuser head 56 which can be selectively manually closed so as to preclude discharge through any particular nozzle or nozzles while the remainder of the nozzles are in operation. By the same token, by not associating the diffuser head 56 with the spring-loaded valve, the position of the diffuser head 56 can be set and maintained, and will not be affected by variations of pressure. Incidentally, as will also be appreciated from a review of FIG. 10, the nozzle itself can be integrally formed with the support 90, providing a more compact and more economical unit in that the support, valve body and nozzle body will thus be formed in one piece rather than as three separate components.

With reference to FIGS. 1 and 7, the system of the instant invention also contemplates the incorporation of a pressure release valve 106 having a first end communicated with the main 30 through a tube section 108 and the second end thereof communicated, through a second tube section 110, with an enlarged reservoir 112 which in turn has a discharge tube 114 extending to an appropriate discharge point, normally the floor adjacent the bench or an adjoining drain. The actual construction of the pressure release valve 106 is similar to that of the nozzle associated valve 64 of FIG. 2 with the sliding valve member 116 seating against a seat provided adjacent the discharge end thereof remote from the main 30. An expanded coil compression spring 118 biases the valve member 116 away from the seat and toward the end of the valve 106 communicated with the main 30, it being an intention of the system that the valve member 116 unseat upon a drop of the pressure in the main 30 below a predetermined point, approximately 5 pounds as an example, above the point at which the nozzle associated valves seat or close. Thus, while the pressure in the main 30 is maintained at operational level, for example 18 pounds per square inch, the valve member 116 will remain seated and the nozzle valves will be maintained open so as to effect the desired spraying operation. Upon a termination of the pressurized flow into the main 30, the pressure will drop and, upon a dropping to approximately 5 pounds per square inch, the valve member 116 will unseat and rapidly release the built-up internal pressure to the level at which the individual nozzle valves will shut, such being approximately 2 pounds per square inch. In this manner, there will be a substantially immediate and simultaneous cutoff of the discharge at the individual nozzles whereby an exact controlling of the watering operation can be easily effected.

The pressure release valve 106 is to be communicated with the main 30 at the highest point along the length thereof. Thus, upon a shutting off of the water and a dropping of the pressure within the main 30, there will be no tendency for the water to merely run out of the main. This is desirable in that it is intended that the main 30 be maintained full or substantially full at all times so as to insure a proper simultaneous discharge through all of the nozzles when the system is activated, this is turn providing for a proper spray distribution at all times. Actually, inasmuch as the nozzle valves prevent drainage or dripping at the individual nozzles, the entire system can be orientated at at least a slight inclination, the pressure release valve 106 again being orientated at the high point on the main 30.

As will be appreciated from FIGS. 1 and 7, it is contemplated that the tube section 110, associated with the pressure release valve 106, lie over the suspension cable 20 so as to properly position the pressure discharging system. The actual function of the enlarged reservoir 112 is so as to preclude any tendency for the pressure releasing system to continue to siphon water from the main 30 subsequent to a release of the pressure. An appropriate venthole 120 will be provided at the upper end of the reservoir 112.

It is contemplated that the main 30 be of flexible polyethylene tubing, normally ¾ inch in diameter in runs up to 100 feet long. This main will of course be connected to a source of pressurized water. The supply line tube portions are also preferably of flexible polyethylene tubing having a flow passage diameter of approximately ⅛ inch. This utilization of supply tubes of a substantially reduced diameter relative to the main is considered significant in that the supply tubes themselves act so as to monitor the pressure within the main whereby only such flow as can be effectively distributed through the nozzles is introduced to the nozzles. There is thus achieved a metering of the water directly at the main which results in a maintenance of the pressure within the main at a fairly constant level throughout extremely long runs. As will be readily appreciated from the drawings, the supply tube sections are provided with beveled ends for frictional engagement with the various components, including the valves, the main, the supports, and the reservoir, thus eliminating both the expense and the trouble which would be involved were it necessary to use connectors, particularly in view of the small nature of the tubing involved. It will be appreciated that the slightly flexible nature of the polyethylene material provides for a positive frictional gripping of the tubing. Incidentally, if is contemplated that the bodies of the valves, supports, nozzles, and the like be constructed of a rigid polyethylene. Another significant advantage of the provision of flexible tubing, both for the supply lines and for the main resides in the ability of the supports 22, and more particularly the nozzles associated therewith, to be in effect self-adjusting so as to maintain a proper vertical orientation of the nozzles and an effective distribution of the water therefrom so as to achieve the desired coverage. The swingable hangers 24 also significantly contribute to a leveling of the nozzles, as well as the main 30 itself, this leveling being effected both laterally and longitudinally, the hangers, in addition to swinging, being capable of sliding along the suspension wire 20.

In actual use, upon the introduction of water under pressure into the main 30, the pressure buildup, which due to the full nature of the main is substantially instantaneous, opens the individual nozzle valves and closes the pressure release valve. When the system is shut off, the reduction of the pressure with the main 30 to approximately 5 pounds results in an opening of the pressure release valve 106 which in turn causes a substantially instantaneous pressure drop to the point, approximately 2 pounds, at which the individual nozzle valves are closed, thereby completely cutting off the flow of water to the individual nozzles so as to preclude any dripping or continued flow therethrough. Inasmuch as the pressure release valve 106 is communicated with the highest point on the main 30, the water, subsequent to a release of pressure in the main 30, will not merely run out the pressure release system, thus resulting in a maintaining of the main 30 substantially full of water for an instantaneous reactivation of the system. Incidentally, it will be appreciated that the nozzles 40 are downwardly directed and orientated below the main 30. In this manner, the main 30 will remain dry so as to avoid any drippage from the main 30 such as tends to occur when the nozzles are orientated above the main. The significance of this resides in the elimination of any potential damage to plants, seedlings or the like such as could conceivably result from droplets falling thereon as opposed to a fine mist or spray from the nozzles themselves.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An overhead spray system comprising an elongated main, means for positioning said main vertically above and along an area to be sprayed, a plurality of nozzles provided at longitudinally spaced points along said main, fluid-transmitting means engaged between each nozzle and said main, said fluid-transmitting means including valve means interposed between the main and the corresponding nozzle, said valve means operating independently of the nozzle and automatically closing upon the dropping of the pressure in the main and fluid-transmitting means below a predetermined point, the nozzles being located below and downwardly directed relative to the main, and pressure release valve means communicated with said main, said pressure release valve means being operable to open and release pressure within the main upon a dropping of the pressure within the main below a predetermined point above the point at which the first-mentioned valve means close, said pressure release valve means including antisiphon means and being communicated with generally the highest point on the main so as to maintain fluid in the main subsequent to a release of pressure.

2. An overhead spray system comprising an elongated main, means for positioning said main vertically above and along an area to be sprayed, a plurality of nozzles provided at longitudinally spaced points along said main, fluid-transmitting means engaged between each nozzle and said main, said fluid-transmitting means including valve means interposed between the main and the corresponding nozzle, said valve means operating independently of the nozzle and automatically closing upon the dropping of the pressure in the main and fluid-transmitting means below a predetermined point, the nozzles being located below and downwardly directed relative to the main, said pressure release valve means communicated with said main, said pressure release valve means being operable to open and release pressure within the main upon a dropping of the pressure within the main below a predetermined point above the point at which the first-mentioned valve means close, and a manually controlled off-on valve means on each nozzle operable independently of said first-mentioned valve means, the means for positioning the main including a plurality of supports underlying said main at spaced points therealong, and hanger means engaged with each support and extending thereabove for engagement with overhead suspension means, each support having one of said nozzles depending therefrom, and a generally arcuate cradle defined in the upper portion of each support for a seated reception of the main therein, said main being adjustably movable within said cradles, said hanger means being pivotally engaged with the corresponding support and adjustably engageable with the overhead suspension means.

3. The system of claim 2 wherein the fluid-transmitting means is communicated with each nozzle through the corresponding support, said fluid-transmitting means having a flow diameter substantially reduced relative to that of the main for effecting an automatic metering of the flow.

4. The system of claim 3 wherein the first valve means associated with each nozzle is integrally formed with the corresponding support.

5. The system of claim 4 wherein each nozzle is integrally formed with the corresponding support.

6. An overhead spray system comprising suspension means overlying an area to be sprayed, an elongated main below said suspension means and extending longitudinally along the area to be sprayed, a plurality of supports underlying said main at longitudinally spaced points therealong, hanger means adjustably engaged with each support and the suspension means, a nozzle on and depending from each support below the main, and flexible fluid-transmitting means engaged between the main and each nozzle for enabling a self-adjusting movement of the main and nozzles without affecting the transmission of fluid therebetween.

7. The system of claim 6 wherein each of said nozzles is downwardly directed so as to discharge below said main.

8. The system of claim 7 including a manually controlled on-off valving means on each nozzle and a pressure responsive valve incorporated in each fluid-transmitting means independently operable relative to the on-off valving means of the associated nozzle.

* * * * *